United States Patent [19]

Suzuki et al.

[11] Patent Number: 4,660,854
[45] Date of Patent: Apr. 28, 1987

[54] FRAME CONSTRUCTION FOR MOTORCYCLES

[75] Inventors: Toshiyuki Suzuki, Simada; Yuro Yoshida, Hamamatsu, both of Japan

[73] Assignee: Yamaha Hatsudoki Kabushiki Kaisha, Iwata, Japan

[21] Appl. No.: 810,498

[22] Filed: Dec. 18, 1985

[30] Foreign Application Priority Data

Dec. 18, 1984 [JP] Japan .................................. 59-265257
Dec. 18, 1984 [JP] Japan .................................. 59-265258

[51] Int. Cl.$^4$ ............................................ B62D 21/00
[52] U.S. Cl. .................................... 280/782; 180/219; 280/281 R
[58] Field of Search ........................... 280/782, 281 R; 180/219

[56] References Cited

U.S. PATENT DOCUMENTS

| 4,427,087 | 1/1984 | Inoue et al. | 180/219 |
| 4,469,190 | 9/1984 | Yamaguchi | 180/219 |
| 4,556,119 | 12/1985 | Shiratsuchi | 180/219 |

Primary Examiner—John J. Love
Assistant Examiner—Kenneth R. Rice
Attorney, Agent, or Firm—Harness, Dickey & Pierce

[57] ABSTRACT

An improved frame construction for a vehicle such as a motorcycle in which the main tube and down tubes are connected to the head pipe at its lower end so as to afford an increased gas tank capacity. A reinforcement brace in the form of upper and lower braces absorb bending and twisting forces at the connection between the main and down tubes and the head pipe. The connection of the down tube to the reinforcement brace is disconnectable so as to permit removal for servicing of the engine.

15 Claims, 6 Drawing Figures

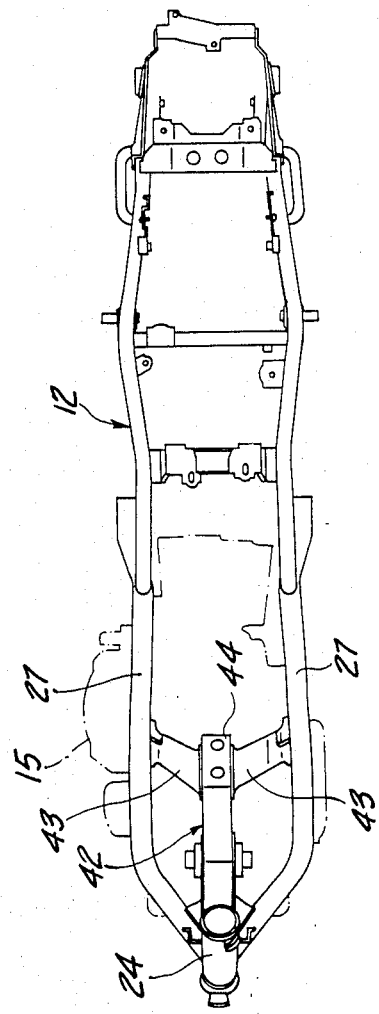
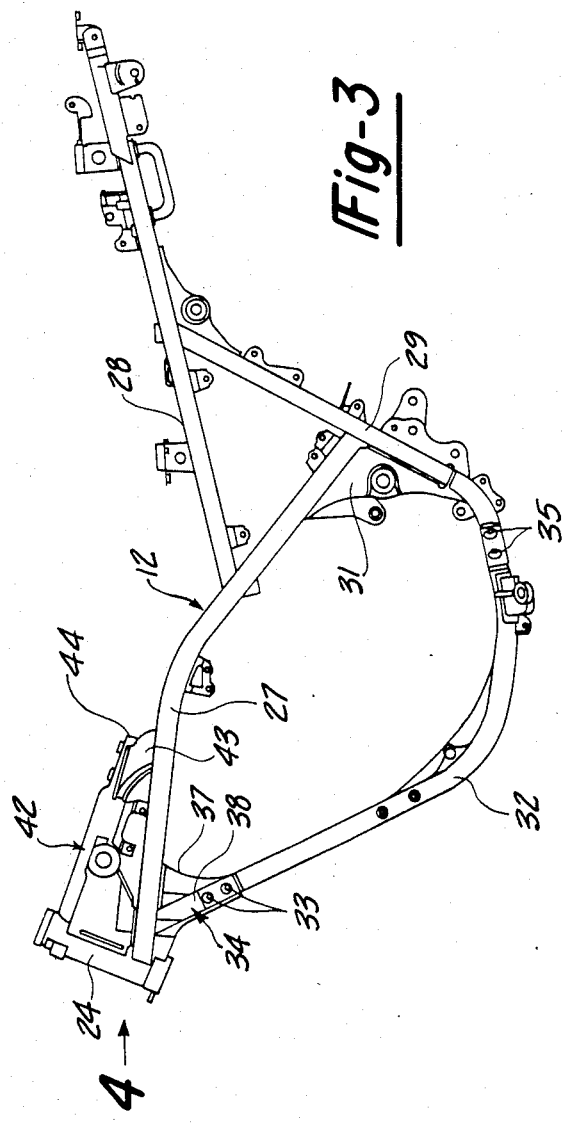

FRAME CONSTRUCTION FOR MOTORCYCLES

BACKGROUND OF THE INVENTION

This invention relates to a frame construction for motorcycles and more particularly to an improved light weight, compact highly strong and readily serviceable frame arrangement for vehicles.

Although light weight single rider vehicles such as motorcycles have been the subject of considerable development through the years, their frame constructions have been generally similar throughout their development period. The frame normally consists of a head pipe which is a generally vertically extending tube and which supports the front wheel for its steering movement. Affixed to and extending rearwardly and generally horizontally from the head pipe is one or more main tubes. One or more down tubes also extend downwardly and rearwardly from the head pipe and the down tubes and main tubes generally are joined in some manner at their rearward end in the area where the rider's seat is positioned. The engine and transmission of the vehicle are normally positioned within the area bounded by the main and down tubes and may be supported by one or both of these tubes. It is also the practice to position the fuel tank ahead of the rider's seat and above the main tube. This means that the volume of the fuel tank is substantially diminished because of the proximity to the main tube.

Although it is possible to increase the capacity of the fuel tank by lowering the main tube and connecting it to a lower portion of the head pipe, this can present serious problems since this is a highly stressed area. This is particularly true where the rear wheel is also supported at the juncture between the main and down tubes so that the suspension loading will be transferred to the main tube.

It is, therefore, a principal object of this invention to provide an improved frame construction for a vehicle.

It is another object of this invention to provide an improved frame construction for a vehicle embodying a main tube and in which the fuel tank is positioned above and in proximity to the main tube.

It is a still further object of this invention to provide an improved reinforcing construction for a motorcycle frame that permits lowering of the main tube relative to the head tube or head pipe.

Because of the extremely compact nature of motorcycles, it is very difficult to service the components and still provide a rigid and strong frame. This is because of the location of the engine and transmission in the area normally bounded by the main and down tubes, as aforedescribed.

It is, therefore, a still further object of this invention to provide an improved frame construction for a vehicle which facilitates servicing and removal of the engine and transmission assembly.

SUMMARY OF THE INVENTION

This invention is adapted to be embodied in a frame construction for a vehicle having at least one front wheel dirigibly supported by the frame and at least one rear wheel carried by the frame. The frame includes a head pipe that provides a steering journal for the dirigible wheel and a main tube that is connected at its forward end to the head pipe and which extends rearwardly therefrom. Reinforcing means are connected between the head pipe and the main tube for resisting twisting and bending forces on the joint between the main tube and the head pipe.

BRIEF DESCRIPTION OF THE DRAWINGS

FIG. 2 is a top plan view showing the frame of the motorcycle.

FIG. 3 is a side elevational view of the frame.

DETAILED DESCRIPTION OF THE PREFERRED EMBODIMENT

Figure 1:
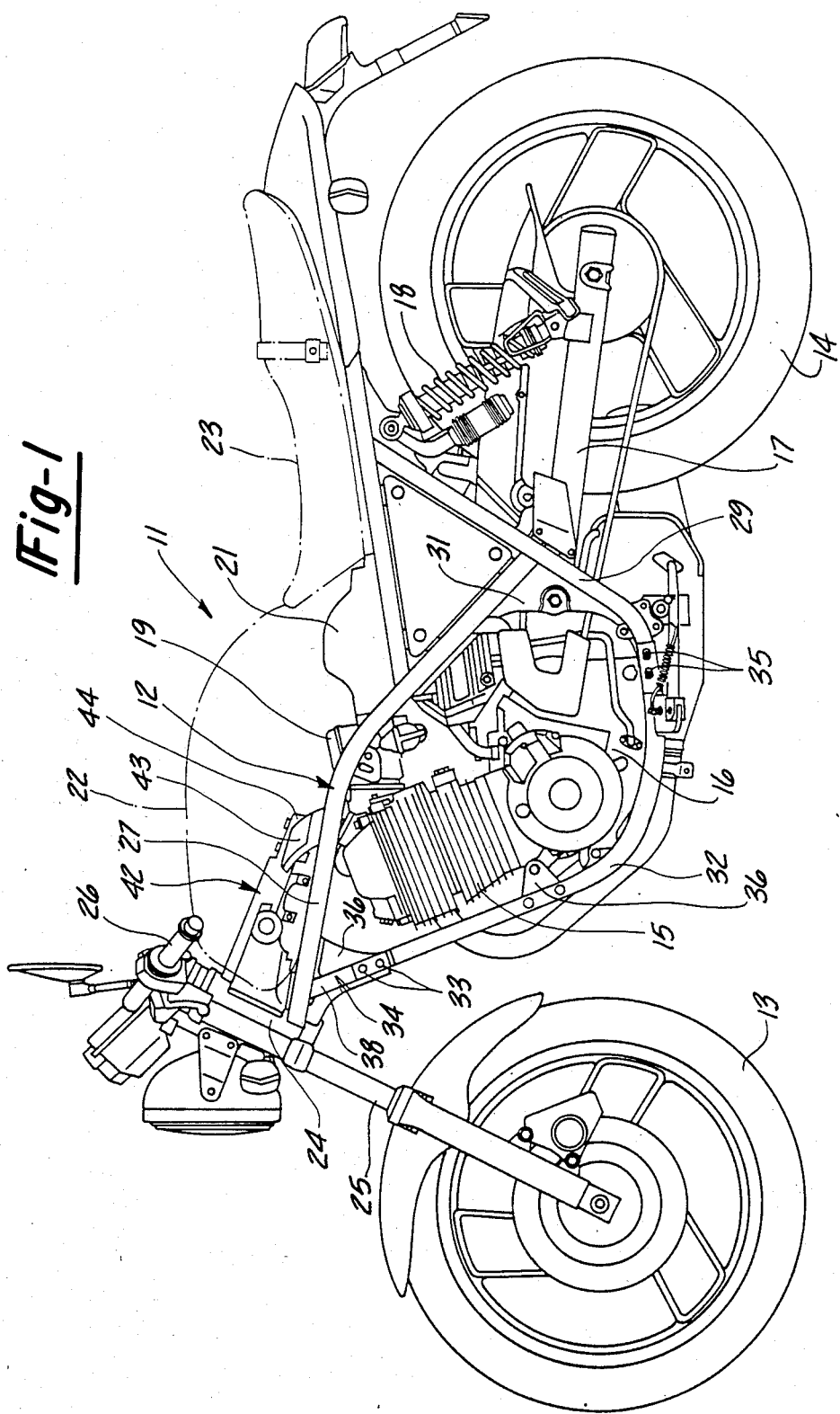
FIG. 1 is a side elevational view of a motorcycle constructed in accordance with an embodiment of the invention.
Figure 4:
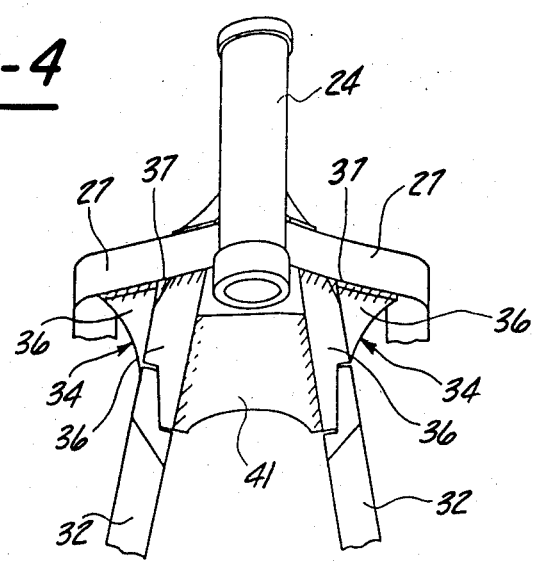
FIG. 4 is an enlarged front elevational view of the area around the head pipe and is taken generally in the arrow 4 in FIG. 3.
Figure 5:
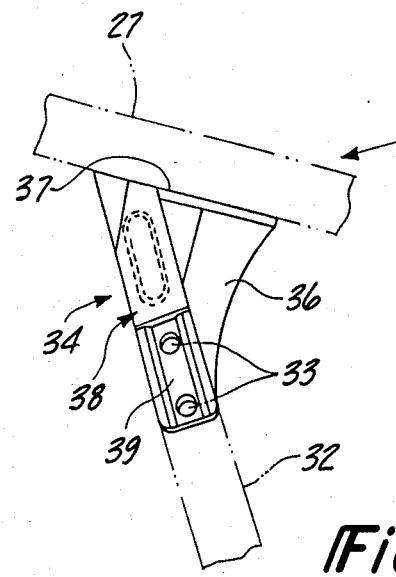
FIG. 5 is a side elevational view of the area shown in FIG. 4.
Figure 6:
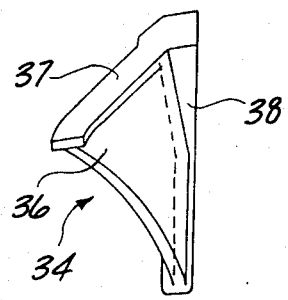
FIG. 6 is an enlarged side elevational view of the supporting and connecting member of the frame looking in the direction of the arrow 6 in FIG. 5.

Referring first primarily to FIG. 1, a motorcycle constructed in accordance with an embodiment of the invention is identified generally by the reference numeral 11. The invention is described in conjunction with a motorcycle and more particularly in conjunction with its frame assembly, indicated generally by the reference numeral 12. It is to be understood, however, that certain facets of the invention may be employed in vehicles other than motorcycles. However, the invention has particularly utility with vehicles of the light weight, single rider type wherein one or more front wheels are dirigibly supported by a head pipe and wherein the frame includes a main tube that is connected at its forward end to the head pipe.

In addition to the frame 12, the motorcycle 11 includes a dirigible front wheel 13 which is journaled by the frame 12 in a manner to be described, and a driven rear wheel 14. The rear wheel 14 is driven by means of an internal combustion engine 15, which may be of any known type, which is supported by the frame 12 and which drives the rear wheel through a drive arrangement which includes a combined crankcase transmission assembly 16 of the engine 15. The rear wheel 14 is also suspended for suspension movement by means including a trailing arm assembly 17 which is connected to the frame 12 in a manner to be described and a shock absorber spring arrangement 18.

The engine 12 is provided with an induction system which includes one or more carburetors 19 that receive a filtered air supply from an air inlet device 21. The carburetors 19 extend rearwardly as does the air inlet device 21 and are positioned generally beneath a saddle type fuel tank which is shown in phantom and which is identified by the reference numeral 22. The fuel tank 22 is carried by the frame 12 in a manner which will be generally described. A rider's seat 23 is carried by the frame 12 rearwardly of the fuel tank 22.

Referring now additionally to the remaining figures, the construction of the frame assembly 12 will be described as will its relationship to certian other components of the motorcycle 11. The entire frame assembly is depicted in FIGS. 2 and 3 wherein all other components of the motorcycle 11 have been eliminated so as to facilitate the understanding of the construction of the frame assembly 12. However, the engine and transmission assembly 15 has been shown in phantom in FIG. 2 so as to show its relationship to the frame 12.

The frame 12 includes a head pipe 24 that extends in a generally vertical direction and which forms the forwardmost portion of the frame assembly. The head pipe 24 functions to journal a front fork assembly 25 that journals the wheel 13 and which may be steered by means of a handlebar 26 (FIG. 1). A pair of main tubes 27 are welded at their forward end to the head pipe 24 and extend generally rearwardly therefrom. Unlike prior art type of constructions wherein the main tube or tubes are welded to the head pipe 24 at its upper end, in this invention, the main tubes 27 are affixed, as by welding, to the head tube 24 adjacent its lower end. This permits a lower overall configuration for the frame assembly 12 and also provides less encroachment in the area of the fuel tank 22 so as to permit a larger fuel capacity.

At about the mid points of the main tubes 27, they are bent downwardly to form a juncture, to be described, with the remaining portion of the frame. Adjacent this downwardly bend area, there are attached to the main tubes 27, as by welding, a pair of rearwardly extending seat rails 28 onto which the seat 23 is mounted. A pair of seat pillar rails 29 are affixed, as by welding, to respective of the seat rails 28 and extend downwardly and forwardly. The rear ends of the main tubes 28 are affixed, as by welding, to the seat pillar rails 29. In addition, a bracket 31 is affixed to the tubes 27 and the pillars 29 adjacent their juncture. The brackets 31 serve to provide the pivotal support for the trailing arm assembly 17 in a known manner.

A pair of down tubes 32 are detachably connected, by means of fasteners 33, to the head pipe 24 and respective of the main tubes 27 by means of a reinforcing bracket assembly, indicated generally by the reference numeral 34. The downtubes 32 extend downwardly and rearwardly from the reinforcing bracket 34 and head pipe 24 to the lower end of the frame and then extend rearwardly where they are detachably connected to the brackets 31, seat pillar rails 29 and main tubes 27 by detachable fasteners 35.

The described frame construction is generally of the double cradle type and the frame assembly defines a cavity in which the engine transmission assembly 15 is positioned. The engine transmission assembly 15 is carried at its forward end by the down tubes 32 by means of engine supports 36 and at its rear end to suitable connections to the frame adjacent the brackets 31. The engine transmission assembly 15 may be conveniently removed for servicing by detaching the fasteners 33 and 35 and removing the down tubes 32.

As has been noted, the main tubes 27 are connected to the head pipe 24 at a lower point than with convention frame constructions. The same is also true with respect to the connection of the down tubes 33 via their interconnection to the head pipe 24 through the main tubes 27. As a result, the bending stresses are higher than the situation where a more normal type of frame construction would be employed. However, twisting and bending forces are resisted in part by the interconnecting bracket assembly 34. To this end, the bracket assembly 34 is comprised of a pair of gusset plates 36 that are connected between horizontally extending bars 37 that underlie the main tubes 27 and vertically extending tubular members 38. The lower ends of the tubular members 38 are connected by means of the fasteners 33 and further brackets 39 to the upper ends of the down tubes 32, as aforenoted. In addition, a reinforcing gusset plate 41 extends between the tubes 36 and is welded to them so as to afford further strengthening. Hence, the connecting bracket assembly 34 provides sufficient rigidity and strengthening so as to resist at least a portion of the bending forces and to afford the detachable connection.

A further reinforcing assembly, indicated generally by the reference numeral 42 is further provided for strengthening this area and absorbing the bending and twisting forces. The reinforcing assembly 42 comprises a first member that is affixed at its forward end to the head pipe 24 and which is connected at its rear end to a pair of strap brackets 43 that extend between the main tubes 27 by means of a fastener assembly 44. The bracket assemblies 42 and 34 provide sufficient rigidity for the connection between the head pipe 24 and the remainder of the frame so as to absorb all loads.

It should be readily apparent from the foregoing description that the described frame construction affords extremely high strength, ease of repair due to the detachability of the down tubes 32 and also a low center or gravity and a large fuel capacity. Because of the construction, it is also possible to utilize square tubing such as metal extrusions for the main pipe and down tube.

Although an embodiment of the invention has been illustrated and described, various changes and modifications may be made without departing from the spirit and scope of the invention, as defined by the appended claims.

We claim:

1. In a frame construction for a vehicle having at least one front wheel dirigibly supported by said frame and at least one rear wheel carried by said frame, a head pipe providing a steering journal for said dirigible wheel, a pair of main tubes connected at their forward ends to said head pipe at the lower end thereof and extending rearwardly therefrom, and reinforcing means connected between said head pipe and said main tube for resisting twisting forces on the joint between said main tube and said head pipe, said reinforcing means comprising an upper brace comprising a first piece extending between said main tubes rearwardly of their connection to said head pipe and a second piece affixed to said first piece at its rearward end and to said head pipe at its forward end.

2. In a frame construction as set forth in claim 1 wherein the reinforcing means further comprises a lower brace connected between the lower ends of the main tubes and head pipe.

3. In a frame construction as set forth in claim 2 further including a saddle type fuel tank carried by the frame and juxtaposed to the upper brace.

4. In a frame construction as set forth in claim 1 further including a saddle type fuel tank carried by the frame and juxtaposed to the brace.

5. In a frame construction as set forth in claim 1 wherein the main tubes comprise square members.

6. In a frame construction as set forth in claim 5 wherein the reinforcing means further comprises a lower brace connected between the lower ends of the main tubes and head pipe.

7. In a frame construction as set forth in claim 1 wherein the reinforcing means further comprises a brace affixed to the lower side of the main tubes and to the lower periphery of the head tube.

8. In a frame construction as set forth in claim 7 further including a pair of down tubes each fixed to a respective one of the main tubes through the reinforcing means.

9. In a frame construction as set forth in claim 8 wherein the connection between the down tube and the reinforcing means is a disconnectable connection.

10. In a frame construction as set forth in claim 9 wherein the main tube and down tubes are formed as square tubes.

11. In a frame construction as set forth in claim 1 wherein the frame further comprises a pair of down tubes fixed at their forward ends to respective ones of the main tubes adjacent their juncture with the head pipe and at their rear end to the respective main tube.

12. In a frame construction as set forth in claim 11 wherein an engine is mounted in the frame and a trailing arm supports the rear wheel by means of a pivot provided by the frame.

13. In a frame construction as set forth in claim 12 further including a saddle type fuel tank carried by the frame and juxtaposed to the brace.

14. In a frame construction as set forth in claim 13 wherein the reinforcing means further comprises a lower brace fixed between the upper end of the respective down tube and the lower side of the respective main tube and to the lower end of the head pipe.

15. In a frame construction as set forth in claim 14 wherein the down tube is detachably connected to the frame by means of the reinforcing means.

* * * * *